No. 660,698. Patented Oct. 30, 1900.
E. F. CHENEY.
LISTED CORN CULTIVATOR.
(Application filed June 23, 1900.)
(No Model.) 2 Sheets—Sheet 1.

Witnesses
Edwin F. Cheney, Inventor.
by C. A. Snow & Co.
Attorneys

No. 660,698. Patented Oct. 30, 1900.
E. F. CHENEY.
LISTED CORN CULTIVATOR.
(Application filed June 23, 1900.)

(No Model.) 2 Sheets—Sheet 2.

Witnesses
J. Frank Culverwell.
J. W. Garner

Edwin F. Cheney, Inventor.
by C. A. Snow & Co.
Attorneys

UNITED STATES PATENT OFFICE.

EDWIN F. CHENEY, OF AINSWORTH, NEBRASKA.

LISTED-CORN CULTIVATOR.

SPECIFICATION forming part of Letters Patent No. 660,698, dated October 30, 1900.

Application filed June 23, 1900. Serial No. 21,362. (No model.)

*To all whom it may concern:*

Be it known that I, EDWIN F. CHENEY, a citizen of the United States, residing at Ainsworth, in the county of Brown and State of Nebraska, have invented a new and useful Listed-Corn Cultivator, of which the following is a specification.

My invention is an improved cultivator for listed corn, one object of my invention being to provide a two-row cultivator having cultivating revoluble disks adapted to throw the earth toward the plants when in operation and means whereby the cultivating-disks may be adjusted to any required angle.

A further object of my invention is to provide means whereby the machine may be adjusted laterally according to the width between the rows of corn.

My invention consists in the peculiar construction and combination of devices hereinafter fully set forth, and pointed out in the claims.

Figure 1:
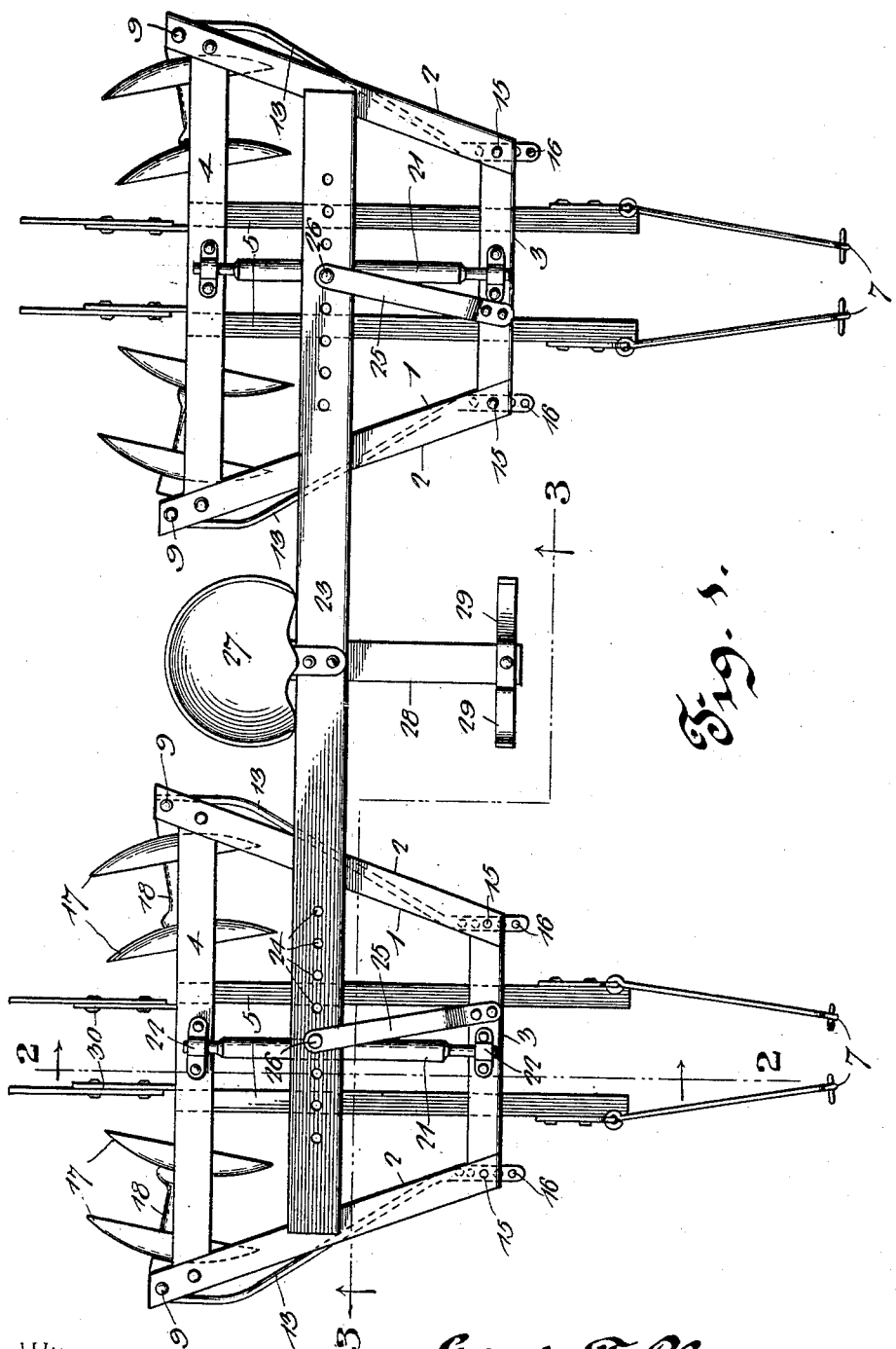
Figure 2:
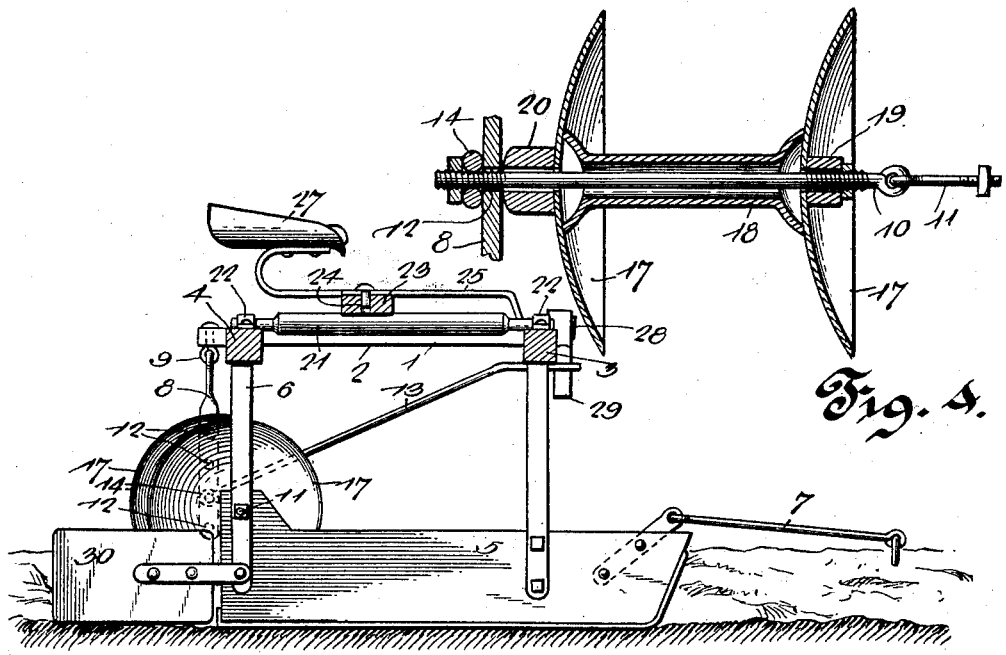
Figure 3:
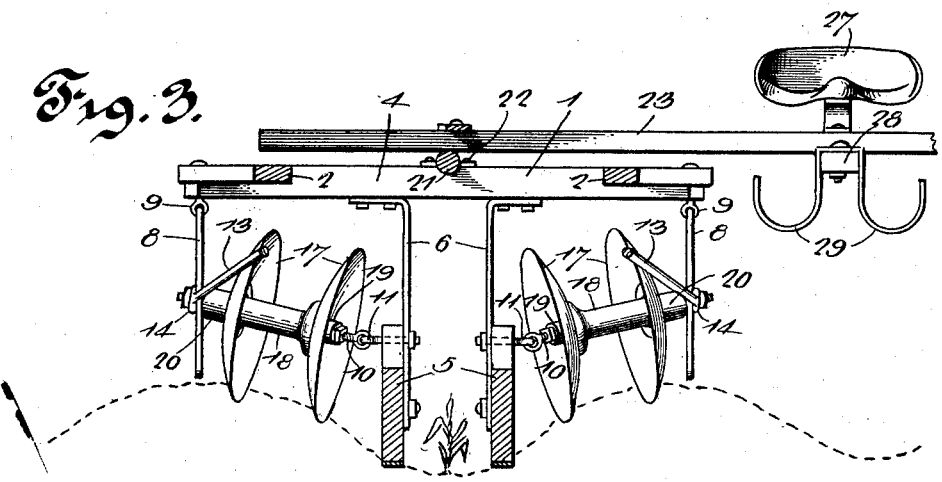

In the accompanying drawings, Figure 1 is a top plan view of a listed-corn cultivator embodying my improvements. Fig. 2 is a sectional view of the same, taken on the line 2 2 of Fig. 1. Fig. 3 is a similar view taken on the line 3 3 of Fig. 1. Fig. 4 is a detail sectional view.

In the embodiment of my invention I provide a pair of cultivator-frames 1, each of which comprises a pair of forward-converging side bars 2, a cross-bar 3, connecting the front end of the side bars, and a cross-bar 4, connecting the rear ends thereof. A pair of parallel runners 5 are disposed below the center of each frame 1 and project beyond the front end thereof, and said runners serve to support the cultivator-frames and are attached thereto by means of vertical rods 6, which rods are bolted to said runners and to the cross-bars of the cultivator-frame. Draft-rods 7 are attached to the front ends of the runners and serve for the attachment of the singletrees of the draft-animals. Hanging supporting-rods 8 depend from the rear corners of the cultivating-frames and are attached thereto by means of eyebolts 9. Thereby the hanging supporting-rods are flexibly connected to the cultivating-frames. Axle-shafts 10 have their inner ends attached to the runners by eyebolts 11. The outer ends of the axle-shafts are attached to the hanging supporting-rods 8 by being passed through appropriate openings 12 with which the said hanging supporting-rods are provided, each rod 8 having a series of said openings, whereby the axle-shafts may be secured at any required inclination. Brace-rods 13 are provided in their rear ends with bearings 14 for the outer ends of the axle-shaft, and said brace-rods have their front ends secured under the front corners of the cultivator-frame by bolts 15, which engage appropriate openings 16 with which the brace-rods are provided, each brace-rod having a series of said openings, and hence the hanging supporting-rods in which the outer ends of the axle-shafts are secured may be adjusted as may be required to adjust the said shafts to an appropriate angle obliquely to the rows of corn. On each axle-shaft 10 is mounted a series (any suitable number) of concavo-convex revoluble cultivating-disks 17, their concave sides being disposed toward the centers of the frames. The said cultivating-disks rotate on the said shafts and may be secured thereon in any suitable manner. As here shown tubular sections 18 are interposed between the cultivating-disks, and suitable retaining nuts and blocks 19 20 on said shafts bear against the outer sides of the cultivating-disks. An antifriction-roller 21 is longitudinally disposed on the center of each cultivator-frame and journaled in suitable bearings 22 thereon. A connecting-bar 23 of suitable length connects the cultivator-frame, and the ends thereof bear upon the rollers 21 and are provided with series of adjusting-openings 24. A link-bar 25 is provided to connect each of the cultivator-frames with the bar 23. Said link-bars have their front ends bolted to the cross-bars 3 of the cultivator-frames and their rear ends secured adjustably on the connecting-bar 23 by pins 26 in openings in the rear ends of the link-bars and in appropriate openings 24 in the connecting-bars. By this means it will be understood that the cultivator-frames are secured to the connecting-bar in such manner that they may be adjusted toward or from each other as may be required by the width of the spaces between the rows of corn. A seat 27 for the driver is supported on the center of the connecting-bar 23. A bar 28 projects forward from the center of said connecting-bar and at its front end carries stirrups 29 for the feet of the driver. Fenders 30 are attached to the rear ends of the runners 5 and extend rearward therefrom.

The operation of my invention is as follows: The machine is drawn parallel with the rows of corn and so disposed that the runners 5 operate on opposite sides of the rows of growing plants. This disposes the cultivating-disks on the ridges between the rows, and said cultivating-disks as the machine advances, being set obliquely to the rows of corn, revolve by frictional contact with the soil and serve to thoroughly stir the soil and have their concave sides disposed to the rows and move the soil from the ridges toward the rows of plants. The runners serve to direct the cultivator in a straight line and in connection with the fenders 30 prevent the soil which is displaced by the cultivating-disks from covering the plants.

Having thus described my invention, I claim—

1. In a listed-corn cultivator, the combination of the cultivator-frames having the supporting-runners and cultivating-disks, the rollers mounted on said frames, the connecting-bar bearing on said rollers, and links secured to said cultivator-frames and adjustably secured to said connecting-bar, substantially as described.

2. In a listed-corn cultivator, a frame, a pair of supporting-runners disposed under the center of the frame, revoluble supporting-disks having the inner ends of their axles connected flexibly to said runners, hanging bars flexibly attached to said frame and to which the outer ends of said disk-axles are adjustably connected and brace-rods attached to said hanging bars and adjustably secured to said frame, substantially as described.

In testimony that I claim the foregoing as my own I have hereto affixed my signature in the presence of two witnesses.

EDWIN F. CHENEY.

Witnesses:
C. T. CRAWFORD,
S. C. TATMAN.